(12) United States Patent
Ide et al.

(10) Patent No.: US 9,248,572 B2
(45) Date of Patent: Feb. 2, 2016

(54) AXIS ANGLE DETERMINATION METHOD FOR SIX-AXIS ROBOT AND CONTROL APPARATUS FOR SIX-AXIS ROBOT

(71) Applicant: DENSO WAVE INCORPORATED, Chita-gun, Aichi-pref. (JP)

(72) Inventors: Satoshi Ide, Chita (JP); Naoya Kagawa, Kariya (JP); Daisuke Kawase, Konan (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 14/486,044

(22) Filed: Sep. 15, 2014

(65) Prior Publication Data

US 2015/0120059 A1  Apr. 30, 2015

(30) Foreign Application Priority Data

Oct. 30, 2013  (JP) ................. 2013-225423

(51) Int. Cl.
*G05B 15/00* (2006.01)
*G05B 19/00* (2006.01)
*B25J 9/16* (2006.01)
*G05B 19/402* (2006.01)

(52) U.S. Cl.
CPC ............... *B25J 9/1664* (2013.01); *B25J 9/163* (2013.01); *G05B 19/402* (2013.01); *G05B 2219/39298* (2013.01); *G05B 2219/40562* (2013.01); *Y10S 901/04* (2013.01); *Y10S 901/14* (2013.01)

(58) Field of Classification Search
USPC .................................... 700/245–264
See application file for complete search history.

(56) References Cited

PUBLICATIONS

Yoshikawa, Tsuneo, "Foundations of Robot Control," Chapter 2 Kinematics, 2.5.6 Singular Configurations, Corona Publishing Co., Ltd., Nov. 1988, pp. 58-61 (with translation).

*Primary Examiner* — Bhavesh V Amin
(74) *Attorney, Agent, or Firm* — Oliff PLC (57) ABSTRACT

In an axis angle determination method, an angle or a position of each axis of a six-axis robot is determined. The robot is capable of taking an attitude of a singular point being a state in which rotation axes of fourth and sixth axes match. Based on teaching results of a position and attitude of a hand by point-to-point teaching, the method judges whether an attitude of the robot in which the angle or the position of each angle is to be determined next is a singular point. If judged that the attitude is the singular point, angles of the fourth and sixth axes required for the six-axis robot to move to the singular point are determined such that an angle of one of the fourth and sixth axes is fixed to a current value and an angle of the other axis is determined based on the fixed angle.

8 Claims, 5 Drawing Sheets

AXIS ANGLE DETERMINATION METHOD FOR SIX-AXIS ROBOT AND CONTROL APPARATUS FOR SIX-AXIS ROBOT

CROSS-REFERENCE TO RELATED APPLICATION

This application is based on and claims the benefit of priority from Japanese Patent Application No. 2013-225423, filed Oct. 30, 2013, the disclosure of which is incorporated herein in its entirety by reference.

BACKGROUND

1. Technical Field

The present invention relates to a method and an apparatus for determining an angle of each axis of a six-axis robot based on a result of teaching of a position and an attitude (position/attitude) of a hand of the six-axis robot through teaching.

2. Related Art

A six-axis robot includes first to sixth axes, and is capable of taking an attitude (posture) in which a rotation axis of the fourth axis and a rotation axis of the sixth axis robot match.

For example, in a perpendicular articulated six-axis robot, the rotation axes of a fourth axis and a sixth axis of the six-axis robot match when the six-axis robot takes an attitude (posture) in which a hand of the six-axis robot faces the vertical direction. In this attitude, the number of combinations of the respective angles of the fourth axis and the sixth axis is infinite. Therefore, the attitude is a singular point (singularity) at which a solution of the angle is not uniquely determined.

When the six-axis robot is taught by continuous pass (CP) teaching, the angle of each axis for each position/attitude is uniquely determined. Therefore, the singular point is not an issue. In addition, the singular point is also not an issue when point-to-point (PTP) teaching is performed, if the user specifies the angle of each axis for each position/attitude. The singular point becomes an issue in PTP teaching when only the position/attitude is specified and the angle of each axis is to be determined by inverse transformation.

Conventionally, the singular point is processed as an error. Therefore, a user is forced to avoid singular points. Alternatively, the user is forced to take measures, such as individually specifying the angles of not only the fourth axis and the sixth axis, but also the angles of the remaining axes. As a result, work load on the user also increases.

SUMMARY

It is thus desired to provide an axis angle determination method for a six-axis robot and a control apparatus for a six-axis robot by which each axis angle can be determined for a singular point without placing load on the user.

According to one aspect of the present disclosure, there is provided an axis angle determination method for a six-axis robot. In the method, the angle or position of each axis is determined based on the result of the robot being taught a position/attitude of a hand of the six-axis robot through point-to-point (PTP) teaching. In this instance, the attitude of the robot of which the angle or position of each angle is to be determined next may be a singular point. The singular point is a state in which the rotation axes of a fourth axis and a sixth axis match. When the attitude of the robot is a singular point, the angle of either of the fourth axis and the sixth axis is fixed to a current value and the angle of the other axis is determined to move the robot to the singular point.

In other words, if the angle of either of the fourth axis and the sixth axis is determined to be the current value, the angle of the other axis can be determined so that the six-axis robot can take the position/attitude of the singular point by only the other axis being rotated by a predetermined angle. Therefore, in this method, a singular point is not processed as an error. The angles of the fourth axis and the sixth axis can be determined with certainty.

In the axis angle determination method for a six-axis robot of the present invention, the first axis to third axis of the six-axis robot may be configured by linear-motion axes that are perpendicular to one another. In a six-axis robot configured in this way, the first axis to third axis respectively correspond to three-dimensional coordinates X, Y and Z. The fourth axis to sixth axis are moved in the directions of the coordinate axes. Under a presumption that the six-axis robot is made to perform an operation such as pick-and-place, the six-axis robot often takes an attitude in which the approach vector of the hand indicates the negative direction of the Z axis, and the rotation axes of the fourth axis and the sixth axis match. If this attitude is handled by error processing as in conventional technology, error processing frequently occurs. The work load on the user increases. Therefore, when the six-axis robot configured as described above is the subject, the increase in work load on the user can be prevented. The invention of the present application is very effective.

In the axis angle determination method for a six-axis robot in the present invention, the axis of which the angle is to be fixed to the current value may be the fourth axis. In other words, in the configuration of a common six-axis robot, the rotation range of the fourth axis on the base portion side is often restricted to within±180 degrees, for example. Conversely, unlike the fourth axis, the rotation range of the sixth axis on the hand side is not restricted. For example, the sixth axis is often capable of rotating 360 degrees or more in one direction. This is because the wires and the like that are attached to the robot generally become fewer towards the hand. In other words, for the robot to take the attitude of a singular point, for example, the fourth axis is required to be rotated by half of a full rotation or more when the restriction on the rotation range applies. However, when the sixth axis is rotated, the rotation amount is often minimal. Therefore, the six-axis robot can take the attitude of the singular point in a shorter amount of time.

DESCRIPTION OF THE EMBODIMENTS

First Embodiment

Figure 1:
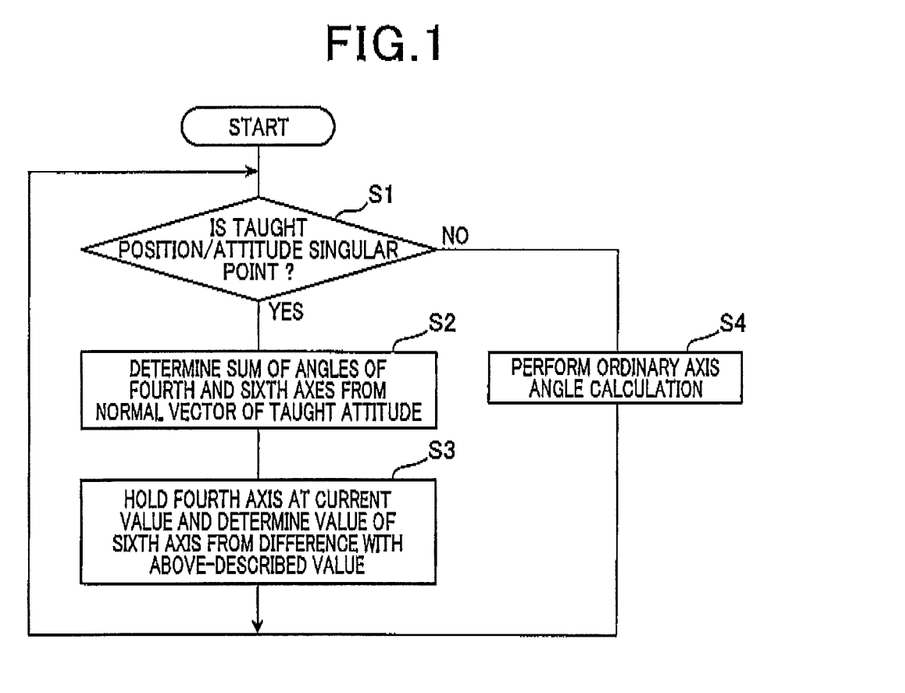
FIG. 1 is a flowchart of a process for determining angles of a fourth axis and a sixth axis of a six-axis robot according to a first embodiment.
Figures 2A, 2B:
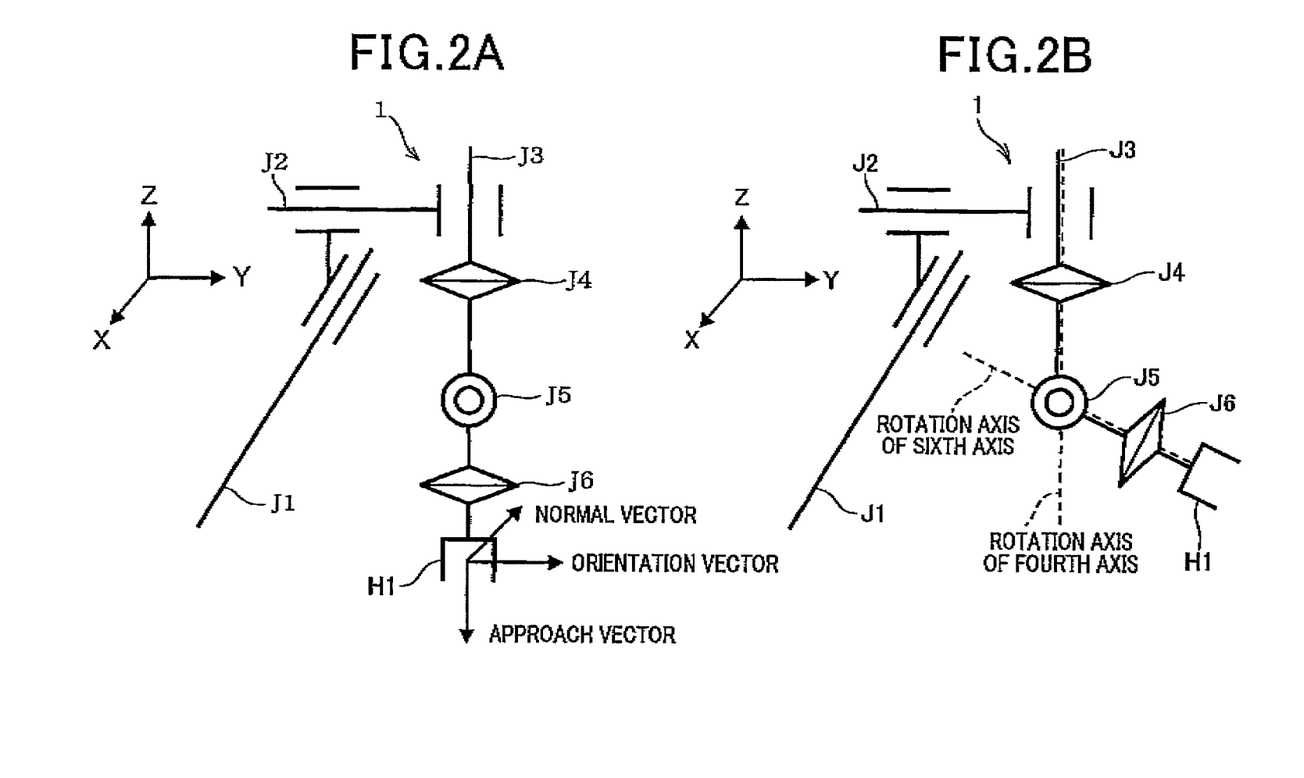
FIG. 2A is a joint model diagram showing a singular point of the six-axis robot.
FIG. 2B is a joint model diagram showing a non-singular point of the six-axis robot.
Figure 3:
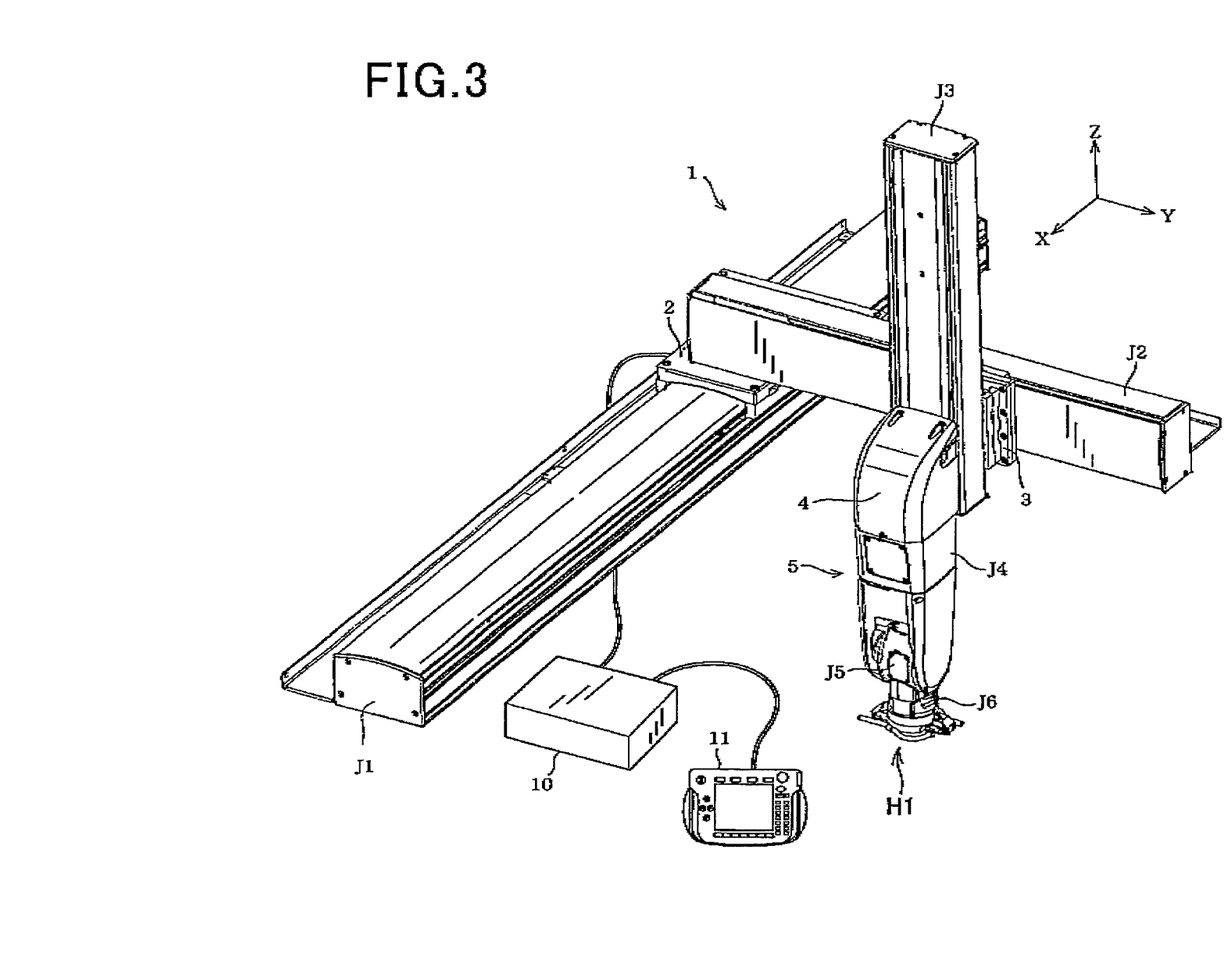
FIG. 3 is a perspective view of a configuration of the six-axis robot according to the first embodiment.

A first embodiment will hereinafter be described with reference to FIGS. 1 to 4. FIG. 3 is a perspective view of a configuration of a six-axis robot. A robot 1 has a first axis J1, a second axis J2, a third axis J3, a fourth axis J4, a fourth axis J5, and a sixth axis J6. Of the axes J1 to J6, the first axis J1, the second axis J2, and the third axis J3 are configured by linear-motion axes that are perpendicular to each other.

The first axis J1 is disposed along the X-axis direction in FIG. 3. The first axis J1 is provided with a ball screw therein (not shown). The first axis J1 also has a nut (not shown). A driving motor 20(1) (see FIG. 4) rotates the ball screw, thereby fastening the nut to the ball screw. A movable body 2 is disposed on the top surface side of the first axis J1. When the driving motor 20(1) rotates the ball screw, the movable body 2 moves linearly along the first axis J1.

The second axis J2 is disposed along the Y-axis direction in FIG. 3. One end side of the second axis J2 is fixed to the top surface of the movable body 2. The second axis J2 is also provided with a ball screw and a driving motor 20(2) therein, in a manner similar to the first axis J1. A movable body 3 is disposed on a surface of the second axis J2 on the positive-direction side of the X axis in FIG. 3. When the driving motor 20(2) rotates the ball screw, the movable body 3 moves linearly along the second axis J2.

The third axis J3 is disposed along the Z-axis direction in FIG. 3. The bottom end side of the third axis J3 is fixed to a side surface of the movable body 3 on the positive-direction side of the X axis in FIG. 3. The third axis J3 is also provided with a ball screw and a driving motor 20(3) therein, in a manner similar to that described above. A movable body 4 is disposed on a surface of the third axis J3 on the positive-direction side of the X axis in FIG. 3. When the driving motor 20(3) rotates the ball screw, the movable body 4 moves linearly along the third axis J3

An arm portion 5 is connected to the movable body 4. The arm portion 5 is composed of the fourth axis J4 to the sixth axis J6. The fourth axis J4 is provided on the base portion side of the arm portion 5. A driving motor 20(4) is provided within the movable body 4. The fourth axis J4 is rotated by the driving motor 20(4) with the Z axis as the rotation axis. The fifth axis J5 is connected to the tip end side (bottom end side in FIG. 3) of the fourth axis J4. The sixth axis J6 is connected to the tip end side of the fifth axis J5.

The rotation axis of the fifth axis J5 is perpendicular to the rotation axis of the fourth axis J4. A driving motor 20(5) is disposed on one end side of the rotation axis of the fifth axis J5. When the fifth axis J5 is driven by the driving motor 20(5), the tip end side of the fifth axis J5 is rotated.

The rotation axis of the sixth axis J6 is perpendicular to the rotation axis of the fifth axis J5. A driving motor 20(6) is provided within the sixth axis J6. The sixth axis J6 is rotatably driven by the driving motor 20(6). The robot 1 is fixed in a state in which, for example, both ends of the first axis J1 are hung from a ceiling in a factory or the like. The position and attitude of a hand H1 of the robot 1 at the tip of the sixth axis J6 are changed by each of the first axis J1 to sixth axis J6 being moved or rotated.

Figure 4:
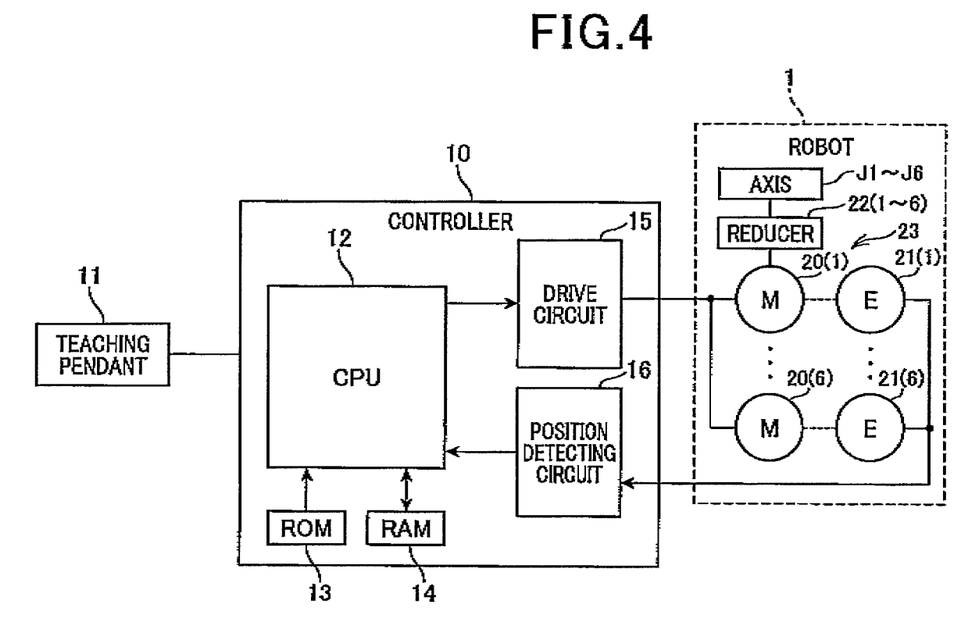
FIG. 4 is a functional block diagram of a configuration of a controller and a driving unit of the six-axis robot shown in FIG. 3.

The robot 1 is connected to a controller 10 (control apparatus including singular point judging means, angle determining means, and rotation axis determining means) and a teaching pendant 11. As shown in FIG. 4, the controller 10 includes a central processing unit (CPU) 12, a read-only memory (ROM) 13, a random access memory (RAM) 14, a drive circuit 15, a position detecting circuit 16, and the like. The CPU 12 controls the overall controller 10 based on programs stored in the ROM 13 or the RAM 14 and the like. In addition, in a manner that is well known, the CPU 12 outputs various commands to the drive circuit 15 to enable the robot 1 to repeatedly perform a work cycle that is determined in advance.

The drive circuit 15 is configured by, for example, an inverter circuit that converts the commands outputted from the CPU 12 to electrical signals. The electrical signals are then used to provide the robot 1 with the commands. The robot 1 includes the plurality of motors 20(1) to 20(6) that respectively drive the first axis J1 to sixth axis J6. The robot 1 also includes encoders 21(1) to 21(6) that to correspond to the plurality of motors 20(1) to 20(6).

The position detecting circuit 16 receives input of signals from the encoders 21(1) to 21(6) for detecting the rotation positions of the motors 20(1) to 20(6). The position detecting circuit 16 thereby detects the rotation positions of the motors 20(1) to 20(6).

The CPU 12 performs feedback control of the motors 20(1) to 20(6) based on the rotation positions of the motors 20(1) to 20(6) detected by the position detecting circuit 16. In the robot 1, the output from the motors 20(1) to 20(6) are transmitted to the first axis J1 to sixth axis J6 via reducers 22(1) to 22(6). The motors 20(1) to 20(6) and the reducers 22(1) to 22(6) configure a driving unit 23.

As in the attitude shown in FIG. 3, a state in which the rotation axis of the sixth axis J6 matches the Z axis in the same manner as the fourth axis J4 is an attitude that is a singular point. As shown in the joint model of the six-axis robot 1 in FIG. 2A, this attitude is a state in which the approach vector of the hand H1 indicates the negative direction of the Z axis. In addition, FIG. 2B shows an attitude that is a non-singular point in which the rotation axis of the sixth axis J6 does not match the rotation axis of the fourth axis J4. Under a presumption that the six-axis robot 1 having the structure shown in FIG. 3 is taught an operation such as pick-and-place, it can be easily recalled that instances in which the position/attitude becomes the singular point occur frequently.

Next, the working according to the present embodiment will be described with reference to FIG. 1. FIG. 1 is flowchart of a process for determining the angles of the fourth axis J4 and the sixth axis J6 for each position/attitude (of a plurality of teaching points) taught to the robot 1 through PTP teaching using the teaching pendant 11. The angles of the other axes and the positions of the movable bodies 2 to 4 are determined in a manner similar to a well-known manner. Therefore, descriptions thereof are omitted. Data indicating each position/attitude of the plurality of teaching points taught to the robot 1 are stored in the ROM 13 or RAM 14 of the controller 10.

First, the controller 10 determines whether or not a position/attitude of the robot 1 that has been taught by PTP teaching is a singular point (step S1). As shown in FIG. 2A, when an approach vector of the attitude of the robot 1 that has been taught is A=(X, Y, Z), the attitude is a singular point when the approach vector A=(0, 0, −1). Therefore, the approach vector A that is the singular point is A=(0, 0, −1) as shown in FIG. 2A. Therefore, the controller 10 determines that the position/attitude of the robot 1 that has been taught is a singular point if (YES), and proceeds to step S2. On the other hand, when determined that the position/attitude of the robot 1 is not a singular point, the controller 10 performs ordinary angle calculation in the same manner as that in the past. The controller 10 thereby determines the angles of the fourth axis J4 and the sixth axis J6 (step S4). Here, step corresponds to singular point judging means (equivalent to a singular point judging unit).

At step S2, the controller 10 determines the sum of the angles of the fourth axis J4 and the sixth axis J6 based on a normal vector of the attitude of the robot 1 that has been taught. This process will be described hereafter. An attitude matrix of the fourth axis J4 to sixth axis 76 of the six-axis robot 1 is expressed as follows.

$$\begin{pmatrix} -C_4C_5C_6 + S_4S_6 & -C_4C_5C_6 + S_4C_6 & C_4S_5 \\ S_4C_5C_6 + C_4S_6 & S_4C_5C_6 + C_4C_6 & -S_4S_5 \\ -S_5C_6 & S_5S_6 & -C_5 \end{pmatrix}$$ [Formula 1]

Normal vector | Orientation vector | Approach vector $C_i$: Cos(angle of $i$ axis), $S_i$: Sin(angle of $i$ axis)

In the attitude matrix, the first column is components of a normal vector (see FIG. 2A), and the second column is components of an orientation vector (see FIG. 2A), the third column is components of an approach vector (see FIG. 2A), $C_i$ and $S_i$ are respectively the cosine and sine of the angle of the to $i(=4$ to $6)$ axis. At the singular point, the angle of the fifth axis J5 is zero degrees. Therefore, $C_5=1$ and $S_5=0$. The attitude matrix becomes as follows.

$$\begin{pmatrix} -C_4C_6 + S_4S_6 & -C_4S_6 + S_4C_6 & 0 \\ S_4C_6 + C_4S_6 & S_4S_6 + C_4S_6 & 0 \\ 0 & 0 & -1 \end{pmatrix}$$ [Formula 2]

The sum $\theta_{4+6}$ of the angles of the fourth axis J4 and the sixth axis J6 is determined as follows based on components of the normal vector.

$$(S_4C_6 + C_4S_6)/(-C_4C_6 + S_4S_6) =$$ [Formula 3]
$$(\tan_4 + \tan_6)/(-1)(1 - \tan_4\tan_6) = -\tan_{4-6} = \tan(\pi - \theta_{4-6})$$

Here, $\tan_i = S_i/C_i$.

When the sum $\theta_{4+6}$ of the angles is obtained at step S2, the controller 10 holds the current angle $\theta_4$ for the fourth axis J4. The controller 10 determines the angle $\theta_6$ of the sixth axis J6 (step S3). In other words, the angle $\theta_6$ is determined by $$\theta_6 = \theta_{4+6}\theta_4$$

Here, steps S2 and S3 correspond to an angle determining means (equivalent to an angle determining unit).

Here, at step S3, the fourth axis J4 is held at the current angle $\theta_4$ and the angle $\theta_6$ of the sixth axis J6 is determined for the following reason.

In other words, in the robot 1, the rotation range of the fourth axis J4 is restricted to within±180 degrees. However, the rotation range of the sixth axis J6 is not restricted in this way. The sixth axis J6 is capable of rotating 360 degrees or more in one direction. This is because the wires and the like that are attached to the robot 1 generally become fewer towards the hand H1.

In other words, to take the attitude of the singular point, for example, the fourth axis J4 is required to be rotated by half of a full rotation or more when the restriction on the rotation range applies. However, when the sixth axis J6 is rotated, the amount of rotation can often be minimal. Therefore, the six-axis robot can take the attitude of the singular point in a shorter amount of time.

According to the present embodiment such as that described above, the angle or position of each of the first axis J1 to sixth axis J6 of the six-axis robot 1 is determined based on the teaching result of the position/attitude of the hand H1 of the of the robot 1 by PTP teaching. In this instance, the attitude of the robot 1 of which the angle or position of each of the first axis J1 to sixth axis J6 is to be determined next may be a singular point. The singular point is a state in which the rotation axes of the fourth axis J4 and the sixth axis J6 match. When the attitude of the robot 1 is the singular point, the controller 10 fixes either of the angles of the fourth axis J4 and the sixth axis J6 to the current value and determines the angle of the other axis to move the robot 1 to the singular point.

In other words, if the angle of either the fourth axis J4 or the sixth axis J6 is determined to be the current value, the angle of the other axis can be determined so that the robot 1 can take the position attitude of the singular point by only the other axis being rotated by a predetermined angle. Therefore, as a result of this method, the singular point is not processed as an error. The angles of the fourth axis J4 and the sixth axis J6 can be determined with certainty.

The robot 1 of which the first axis J1 to third axis J3 are configured by linear-motion axes that are perpendicular to each other is the control subject. Under a presumption that the robot 1, configured in this way, is made to perform an operation such as pick-and-place, the robot 1 often takes the attitude of the singular point. In this attitude, the approach vector of the hand indicates the negative direction on the Z axis. If this attitude is handled by error processing as in conventional technology, error processing frequently occurs. The work load on the user increases. Therefore, when the robot 1 according to the present embodiment is subjected to control, the increase in work load on the user can be prevented. The present embodiment is extremely effective.

In addition, the axis to be fixed to the current value is the fourth axis J4. Therefore, the six-axis robot 1 can take the attitude of the singular point in a shorter amount of time. Furthermore, when the fourth axis J4 is rotated, the amount of rotation may increase as in the instance described above, compared to when the sixth axis J6 is rotated.

Therefore, for example, when the user (operator) is a novice, it can be presumed that the user considers the fourth axis J4 to have rotated significantly more than should be expected based on the teaching result. At this time, the user questions whether or not an error of some sort has occurred in the teaching operation. The user may redo the teaching operation. Redoing an operation that is actually not required is very inefficient. Therefore, a situation in which a novice to the teaching operation is made to have unnecessary doubt can be prevented when the angle of the fourth axis J4 is fixed to the current value and the sixth axis J6 is rotated as according to the present embodiment.

In addition, according to the present embodiment, the Z-axis component of the approach vector A is referenced to determine the singular point at step S1. Determination of the singular point can also be performed based on the temporarily inversely transformed result of the position/attitude that has been taught. Here, examples of processing time in both methods will be compared in detail. As a condition for comparison, the average processing time of 1600 operations is used.

When the amount of time required to solve the inverse transformation is about 14.7 µs, the amount of time required for the controller 10 to make the determination at step S1 is about 0.37 µs. The amount of time required for the controller 10 to determine whether or not the attitude is a singular point based on the result of the temporarily solved inverse transformation, and perform the process again when the attitude is determined to be a singular point is about 29.4 µs.

In this instance, the determination at step S1 becomes meaningful in terms of processing time when the percentage of singular points among all teaching points is 2.5% or more (however, it is presumed that the processing time for a singular point according to the present embodiment is also 14.7 μs). Therefore, under the presumption of an actual case, it can be considered that the determination performed according to the present embodiment is substantially more advantageous.

Second Embodiment

Figure 5:
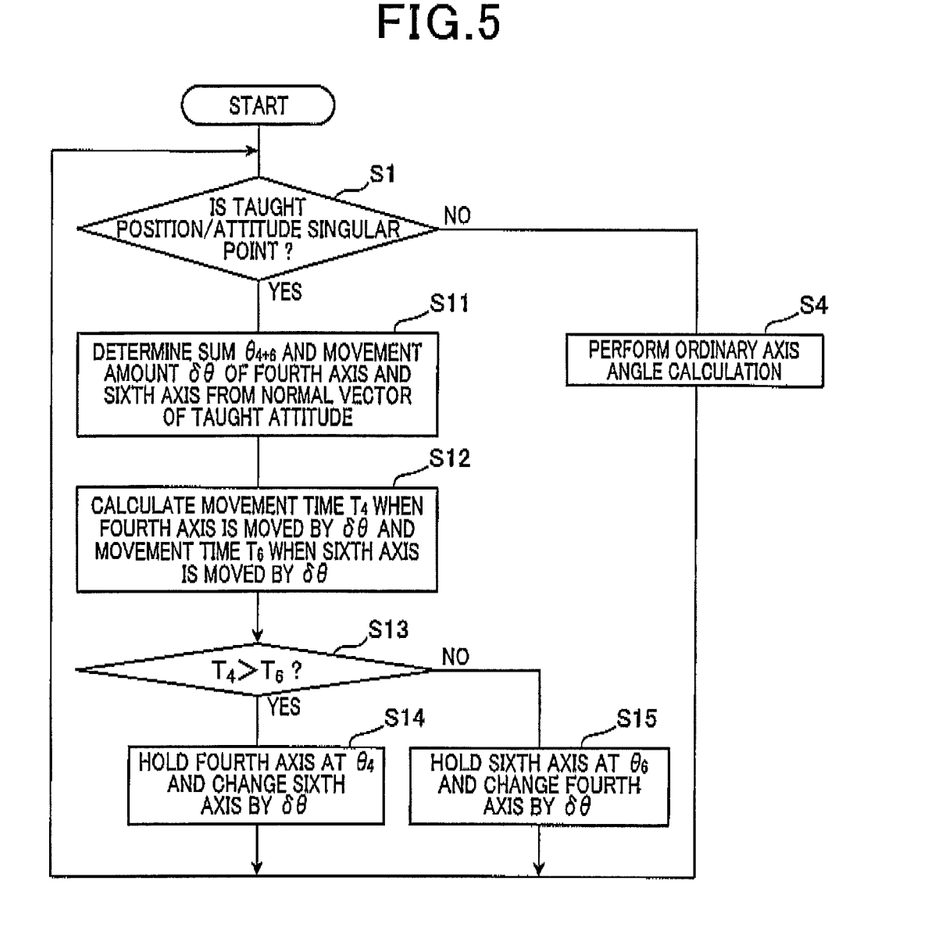
FIG. 5 is a flowchart of a process for determining the angles of a fourth axis and a sixth axis of a six-axis robot according to a second embodiment.

FIG. 5 shows a second embodiment. Sections that are the same as those according to the first embodiment are given the same reference numbers. Descriptions thereof will be omitted. Differences will be described below.

As shown in FIG. 5, according to the second embodiment, when determined "YES" at step S1, the controller 10 determines the sum $\theta_{4+6}$ of the angles at subsequent Step S11, in a manner similar to that at step S2. In addition, the controller 10 determines a movement amount $\delta\theta$ from the current values of the angles. The movement amount $\delta\theta$ herein is equivalent to the "difference" between the angles determined at step S3 according to the first embodiment.

At subsequent step S12, the controller 10 determines time T4 and time T6 based on the respective rotation speeds of the fourth axis J4 and the sixth axis J6. The time T4 is when the fourth axis J4 is rotated by the movement amount $\delta\theta$. The time T6 is when the sixth axis J6 is rotated by the movement amount $\delta\theta$. In other words, the capacities of the respective motors 20(4) and 20(6) and the reduction ratios of the respective reducers 22(4) and 22(6) of the fourth axis J4 and the sixth axis J6 differ. Therefore, the values of the time T4 and the time T6 also differ.

At step S13, the controller 10 compares the lengths of the time T4 and the time T6. When determined that T4>T6 (YES), the controller 10 fixes the angle $\theta_4$ of the fourth axis J4 to the current value. The controller 10 rotates the sixth axis J6 by $\delta\theta$ (step S14). On the other hand, when determined that T4<T6 (NO), the controller 10 fixes the angle $\theta_6$ of the sixth axis J6 to the current value. The controller 10 rotates the fourth axis J4 by $\delta\theta$ (step S15). It goes without saying that either of the fourth axis J4 and the sixth axis J6 can be rotated when T4=T6. Steps S12 and S13 correspond to a rotation axis determining means.

As described above, according to the second embodiment, the controller 10 determines the movement amount $\delta\theta$ from the current values of the angles when the robot 1 is moved from a current position/attitude to an attitude of a next singular point. The controller 10 determines the time T4 when the fourth axis J4 is rotated by the movement amount $\delta\theta$. The controller 10 also determines the time T6 when the sixth axis J6 is rotated by the movement amount $\delta\theta$.

The controller 10 compares the lengths of the time T4 and the time T6. The controller 10 fixes the angle of either of the fourth axis J4 and the sixth axis J6 that has the longer time to the current value. The controller 10 changes the angle of either of the fourth axis J4 and the sixth axis J6 that has the shorter time. Therefore, the amount of time required for movement to the singular point can be shortened. Work efficiency can be improved.

The present invention is not limited to the embodiments described above or shown in the drawings. Modifications and expansions such as those below are also possible.

In the first embodiment, if the rotation range of the fourth axis J4 is not restricted, the angle of the sixth axis J6 may be fixed to the current value. The angle of the fourth axis J4 may be changed. For example, a driving condition that the output torque of the fourth axis J4 increases as the rotation speed of the sixth axis J6 increases can be presumed. When focus is placed on torque depending on the load, it may be more advantageous to change the angle of the fourth axis J4. In addition, in this instance, play in the cables and apparatuses connected by wires outside of the robot 1 can be disposed near the first axis J1 to third axis J3. The first axis J1 to third axis J3 are linear-motion axes. As a result, load placed on the first axis J1 to third axis J3 can be reduced.

The configuration of the six-axis robot is not limited to that shown in FIG. 3. The present invention may also be applied to common perpendicular articulated six-axis robots capable of taking an attitude in which the rotation axes of the fourth axis and the sixth axis match. In this instance, regarding the singular point, a method enabling determination may be used depending on the configuration of the robot.

In the first embodiment, the sum $\theta_{4+6}$ of the angles of the fourth axis J4 and the sixth axis J6 is determined based on components of the normal vector. Alternatively, the sum $\theta_{4+6}$ of the angles of the fourth axis J4 and the sixth axis J6 may be determined as follows based on components of the orientation vector.

$$(-C_4 S_6 + S_4 C_6)/(-S_4 S_6 + C_4 C_6) = \quad \text{[Formula 4]}$$
$$(-\tan_6 + \tan_4)/(-\tan_4 \tan_6 + 1) \tan_{4-6} \tan(\theta_4 - \theta_6)$$

What is claimed is:

1. An axis angle determination method for determining an angle or a position of each axis of a six-axis robot that has first to sixth axes and a hand, the six-axis robot being capable of taking an attitude of a singular point that is a state in which a rotation axis of the fourth axis and a rotation axis of the sixth axis match, the axis angle determination method comprising:
judging, based on teaching results of a position and an attitude of the hand obtained by point-to-point teaching of the six-axis robot, whether an attitude of the six-axis robot in which the angle or the position of each angle is to be determined next is a singular point; and
if judged that the attitude is a singular point, determining an angle of the fourth axis and an angle of the sixth axis required for the six-axis robot to move to the singular point such that an angle of one of the fourth axis and the sixth axis is determined to be fixed to a current value and an angle of the other of the fourth axis and the sixth axis is determined based on the fixed angle of one of the fourth axis and the sixth axis.

2. The axis angle determination method according to claim 1, wherein
the first axis, the second axis, and the third axis are configured by linear-motion axes that are perpendicular to one another.

3. The axis angle determination method according to claim 1, wherein
the axis of which the angle is to be fixed to the current value is the fourth axis.

4. The axis angle determination method according to claim 2, wherein
the axis of which the angle is to be fixed to the current value is the fourth axis.

5. A control apparatus for determining an angle or a position of each axis of a six-axis robot that has first to sixth axes and a hand, the six-axis robot being capable of taking an attitude of a singular point that is a state in which a rotation axis of the fourth axis and a rotation axis of the sixth axis match, the control apparatus comprising:
a singular point judging means that judges, based on teaching results of a position and an attitude of the hand obtained by point-to-point teaching of the six-axis robot, whether an attitude of the six-axis robot in which the angle or the position of each angle is to be determined next is a singular point; and
an angle determining means that, if judged that the attitude is a singular point, determines an angle of the fourth axis and an angle of the sixth axis required for the six-axis robot to move to the singular point such that an angle of one of the fourth axis and the sixth axis is determined to be fixed to a current value and an angle of the other of the fourth axis and the sixth axis is determined based on the fixed angle of one of the fourth axis and the sixth axis.

6. The control apparatus according to claim 5, wherein
the first axis, the second axis, and the third axis are configured by linear-motion axes that are perpendicular to one another.

7. The control apparatus according to claim 5, wherein
the axis of which the angle is to be fixed to the current value is the fourth axis.

8. The control apparatus according to claim 6, wherein
the axis of which the angle is to be fixed to the current value is the fourth axis.

* * * * *